(12) United States Patent
He

(10) Patent No.: US 7,715,044 B2
(45) Date of Patent: May 11, 2010

(54) TWO-DIMENSIONAL GRAY COMPONENT REPLACEMENT

(75) Inventor: Zhen He, Beaverton, OR (US)

(73) Assignee: Xerox Corporation, Norwalk, CT (US)

( * ) Notice: Subject to any disclaimer, the term of this patent is extended or adjusted under 35 U.S.C. 154(b) by 1296 days.

(21) Appl. No.: 11/093,352

(22) Filed: Mar. 29, 2005

(65) Prior Publication Data

US 2006/0227394 A1 Oct. 12, 2006

(51) Int. Cl.
- G06F 15/00 (2006.01)
- G03F 3/08 (2006.01)
- H04N 1/46 (2006.01)
- G06K 9/00 (2006.01)

(52) U.S. Cl. .................. 358/1.9; 358/518; 358/534; 382/167

(58) Field of Classification Search ............ 358/529, 358/518, 520, 523, 530, 534, 538, 539, 1.9, 358/1.15, 1.13, 1.1; 382/167, 162, 274
See application file for complete search history.

(56) References Cited

U.S. PATENT DOCUMENTS

| | | | | |
|---|---|---|---|---|
| 4,656,505 A | * | 4/1987 | Yamada et al. ............ 358/521 |
| 5,117,293 A | * | 5/1992 | Asada et al. ............. 358/2.1 |
| 5,283,671 A | * | 2/1994 | Stewart et al. ............ 358/532 |
| 5,371,616 A | * | 12/1994 | Numakura et al. ......... 358/534 |
| 5,781,206 A | * | 7/1998 | Edge ....................... 347/19 |
| 6,039,434 A | * | 3/2000 | Moroney ................... 347/43 |
| 6,069,981 A | * | 5/2000 | Murakami ................. 382/274 |
| 6,260,948 B1 | * | 7/2001 | Li et al. ................... 347/43 |
| 7,274,491 B2 | * | 9/2007 | Yamada et al. ........... 358/3.06 |
| 2003/0164983 A1 | * | 9/2003 | Yamada et al. ........... 358/3.06 |
| 2003/0169438 A1 | * | 9/2003 | Velde et al. ............... 358/1.9 |
| 2004/0070775 A1 | * | 4/2004 | Yao et al. ................. 358/1.9 |
| 2005/0111693 A1 | * | 5/2005 | Loce et al. ............... 382/100 |
| 2006/0243415 A1 | * | 11/2006 | Holub ..................... 164/130 |
| 2008/0018939 A1 | * | 1/2008 | Yamada et al. ........... 358/3.06 |

* cited by examiner

Primary Examiner—Madeleine A Nguyen
(74) Attorney, Agent, or Firm—Marger Johnson & McCollom, P.C.

(57) ABSTRACT

A method of gray component replacement receives a current pixel color value. A highlight likelihood and color neutrality is determined for the current pixel color value. An output pixel color value depending upon the color neutrality and the highlight likelihood is generated. The input pixel color value is obtained from an image acquisition system and the output color pixel value is used by an output engine to render the pixel.

18 Claims, 5 Drawing Sheets

TWO-DIMENSIONAL GRAY COMPONENT REPLACEMENT

BACKGROUND

In digital printing systems, a picture element (pixel) may be defined as a space on a page into which dots of ink, dye or toner are placed. The placing and number of the dots determines how a human eye integrates the dots and picture elements into an image. Colors of pixels, for example, are generally controlled by the number of dots of different colors of ink within the space. A pixel having a high concentration of yellow dots will appear mostly yellow. The yellow can be altered to appear greener or more orange by the addition of dots of the other colors.

Generally, color imaging processes use subtractive coloring to achieve color images. In digital display systems, the substrate upon which an image is displayed, the screen, is generally considered to be black and colors are added together to form color images. In digital printing, the substrate is generally white, so colors are added together to subtract color from white. The subtractive colors are cyan, magenta and yellow (CMY).

In dye-based color printing systems, the dyes have high purity and intensity and the color black may be recreated on the paper by mixing the three colors together. In ink and toner-based systems, however, that is not usually the case. The mix of CMY generally results in an intermediate brownish color, not black. Therefore, black is added to the available inks and toners, and is represented by the color K.

When an image is produced using CMYK, the addition of black requires that the other color amounts be altered to account for the addition. This process is generally referred to as gray component replacement (GCR) or under color removal (UCR). Most GCR systems rely upon a series of equations that are applied to the current CMYK values of a given pixel. These equations generally only use the minimum value of the CMY values for the current pixel. This may be thought of as performing a one-dimensional GCR process.

For print mode, this one-dimensional method of GCR seems sufficient for the most applications. However, for such applications as the copy mode of multi-function device, where the electronic scan image is a mix of text, pictorial and graphic contents, the one-dimensional GCR process may result in objectionable artifacts in the final output hardcopy, such as graininess in highlight areas, color fringing, texture contouring, edge blurring, and reducing of color in dark areas.

SUMMARY

One embodiment is a method of gray component replacement. A current pixel color value is received. A highlight likelihood and a color neutrality are determined for the current color pixel value. An output color pixel value is then generated depending upon the color neutrality and the highlight likelihood.

Another embodiment is an imaging system. The imaging system has an image acquisition engine, an image processing module that performs gray component replacement and an output engine.

DETAILED DESCRIPTION

Figure 1:
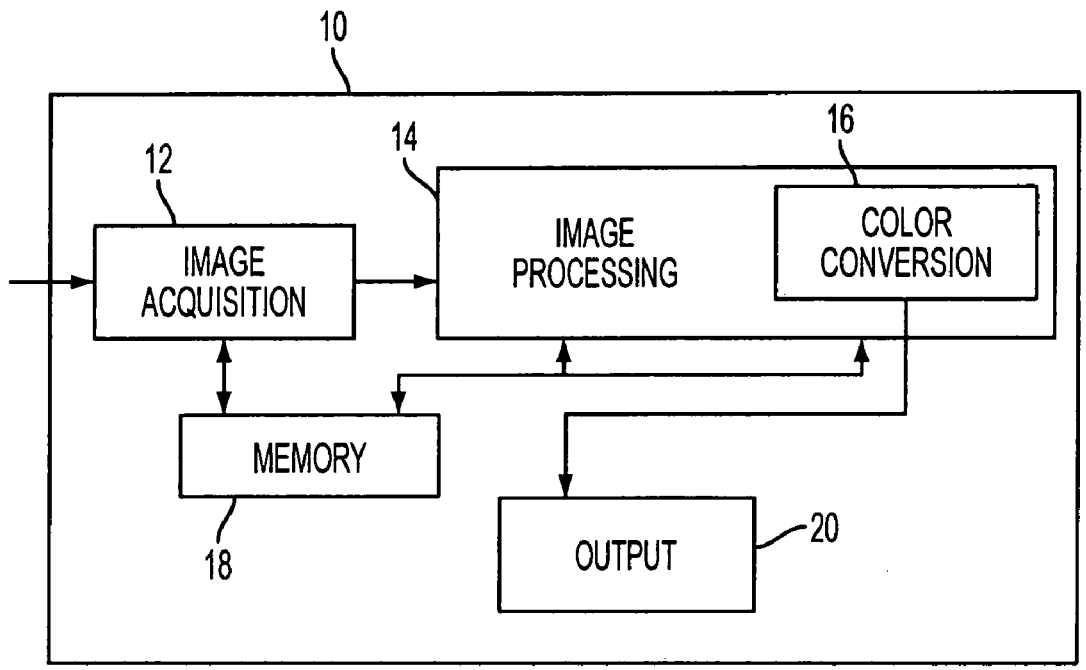
FIG. 1 shows an embodiment of an image acquisition system.

FIG. 1 shows an embodiment of an imaging system 10. The imaging system has an image acquisition engine 12 that acquires data representative of an image. This engine could be a scanner, such as would be on a copy or fax machine. The image data would be acquired by the scanning of a preexisting document to capture the image data. The scanning may be from a glass platen, such as from a copy machine, or a light bar, such as from a fax machine.

In addition to, or in the alternative of, a scanning platen or light bar, the image may be acquired by from a host computer upon which a user has created an original document. This host computer may be directly connected to the device holding the print system, or it may access the device from a data network. In addition, the image acquisition may be from an incoming fax, at a fax receiver across a telephone line. However acquired, the image acquisition engine receives the image data.

The acquired image data is then routed to an image processing module 14. Image processing takes the acquired image values and performs the necessary processing to allow the data to be sent to an output engine for rendering. This may involved color space conversion, such as when the image acquisition engine acquires the image data in the Red-Green-Blue (RGB) or L*a*b color space, and the output engine functions in the Cyan-Yellow-Magenta-Black (CMYK) color space.

It is generally part of this color conversion process that the gray component replacement (GCR) process is performed. Color conversion module 16 may be a dedicated portion of the image processing module, such as a portion of an application specific integrated circuit or a processor, or part of a process running on an image processor. The color conversion module may be implemented in hardware, or as a part of the overall image processing operations.

After image processing, the refined image data in the form of pixel color values is sent to the output engine 20. During this process, the data may be temporarily stored in various stages during the processing in the memory 18. As will be discussed further, the memory may contain look-up tables and/or registers.

The output engine 20 may be one of several different engines capable of rendering an image from the image data. In one embodiment the output engine is a print engine that renders the image onto paper or other printing substrate via ink, dyes or toner. One such example of a print engine is an electrophotographic print engine, also known as a xerographic print engine. Other examples of output engines could be graphics adapters, such as when faxes are converted to electronic mail and routed from a fax server to a user's desktop as images, or the output engine could write the data to a file.

As mentioned above, gray component replacement typically involves altering the color values of pixels to account for the addition of black ink, or manipulating the values of black to account for varying levels of color in certain areas. As mentioned above, the color conversion module may actually be a process running on the image processor 14.

Figure 2:
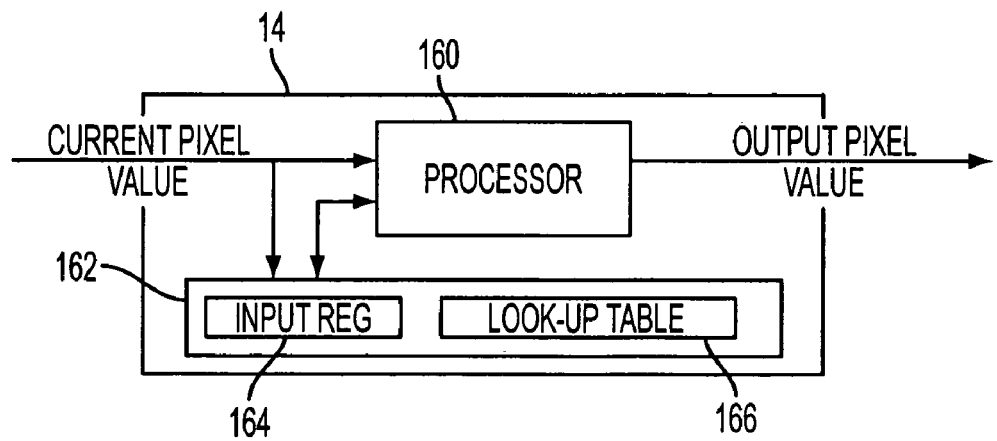
FIG. 2 shows an embodiment of an image processing module performing color conversion with gray component replacement.

In addition, the memory 162 shown in FIG. 2 may be a partition or other segment of the main memory 18 of FIG. 1. The current pixel value from the image processing module may be stored in an input register 164. The processor 160 then processes the current pixel value to produce the output pixel value. The production of the output pixel value may involve the use of look-up table 166, as will be discussed with regard to FIGS. 3 and 4.

Figure 3:
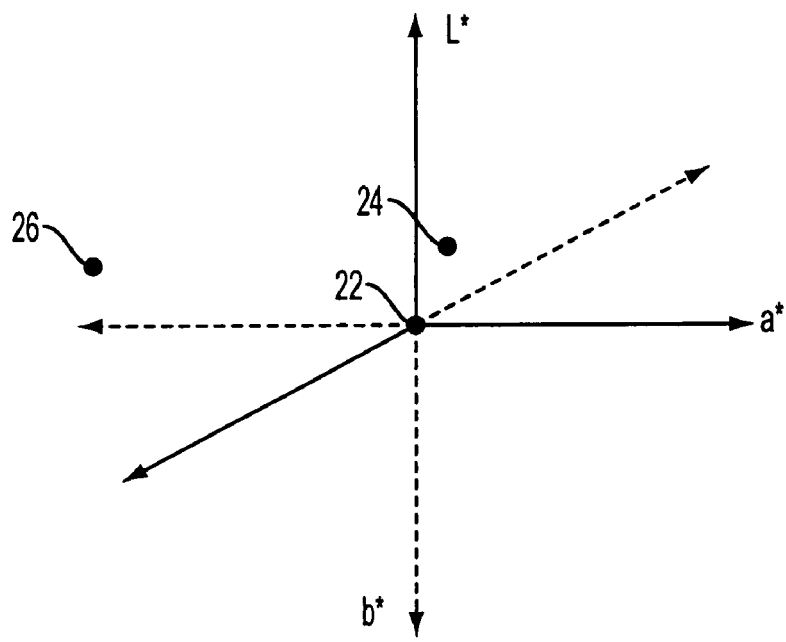
FIG. 3 shows an example of a color space axis.

The color conversion process, in performing gray component replacement, may define three functions with regard to the location of the current pixel color value with regard to the neutral gray axis. FIG. 3 shows an example of a color space as defined by the L*a*b* axes. L* is the luminance or color intensity, a* is the red/green axis, and b* is the yellow/blue axis. The point 22 is at the 'origin' or the neutral color point. Point 24 is close to the neutral gray axis, while point 26 is farther away from the neutral gray axis than the point 24.

Figure 4:
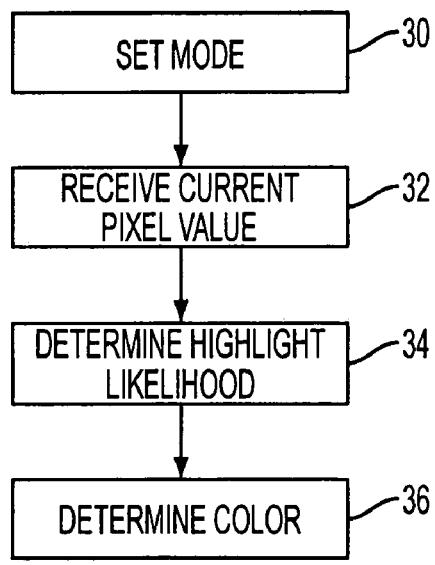
FIG. 4 shows a flowchart of an embodiment of a method to perform gray component replacement.

The color conversion process manipulates the output color pixel values to account for the location of the pixel to the neutral axis as the black component, K, is added to the output pixel color value. An embodiment of this process is shown in FIG. 4. As will be discussed in more detail further, the determination of the output pixel color values may be affected by the mode of the scanning and rending system. For example, the output color pixel values may shift if the device is in text only, graphics only, photographic only, or 'mixed' mode, a blend of the three modes. This mode is 'set' at 30. Setting the mode may be done by a user, or may be determined by the device based upon a profile of the acquired image data. For purposes of this discussion, the mixed mode will be assumed.

At 32, the current pixel color value is received. This is done through the image acquisition module discussed above and may involve the image processing module and the color conversion module, where the GCR process is performed.

It is possible to impose controls over the GCR process in two directions. The first direction is from highlight to mid-tone to shadow areas. The second direction is from the neutral axis to the intermediate colorful area to saturated color. Two characteristic quantities may be defined, one to indicate the likelihood of a pixel being in a highlight region, γ, and one to indicate how neutral a color is, ϕ.

The highlight likelihood is the average of percent coverage of input CMY components of the current pixel color value, where the current pixel color value is $(C_i, M_i, Y_i)$. The quantity γ is defined as:

$$\gamma = \frac{C_i + M_i + Y_i}{3}.$$

The less γ, the less ink coverage there is, the more likely the color belongs to a highlight region. Generally, then, the highlight likelihood is an inverse of the quantity γ. The highlight likelihood of the current pixel color value is determined at 34.

The color neutrality is defined as the ratio of the minimum of the color components CMY for the current pixel color value to the maximum of the color components for the current pixel color value. The color neutrality for the current pixel color value is determined at 36.

$$\alpha = \min(C_i, M_i, Y_{ii})$$

$$\beta = \max(C_i, M_i, Y_i)$$

$$\phi = \frac{\alpha}{\beta}.$$

Having defined these quantities, it is possible to develop a GCR process using the following formulations.

$$K_o = f(\phi) \cdot g(\gamma) \cdot \alpha$$

$$C_o = C_i - K_o h(\phi)$$

$$M_o = M_i - K_o h(\phi)$$

$$Y_o = Y_i - K_o h(\phi).$$

Figure 5:
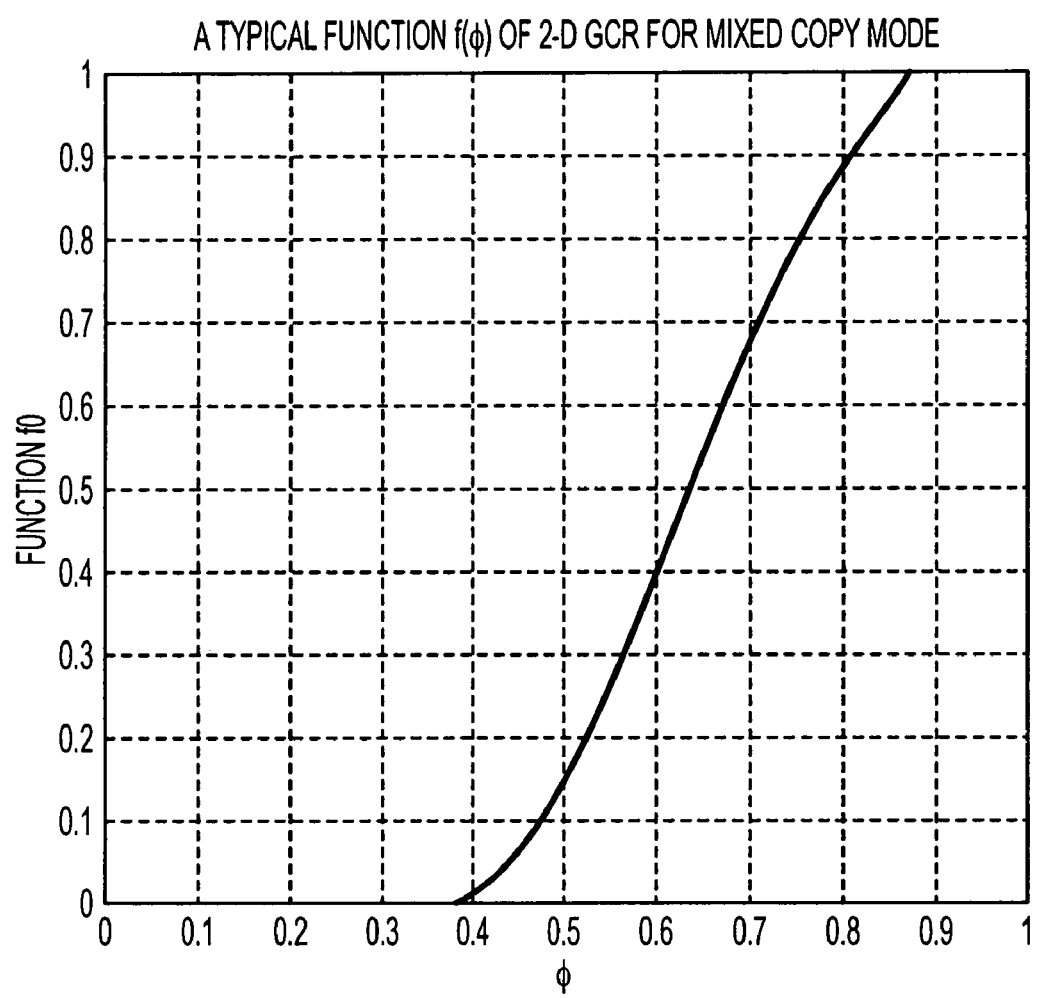
FIG. 5 shows a graphical representation of a function to control black generation in a direction from saturated color to neutral color axis.

The output color pixel values are $C_o, M_o, Y_o, K_o$. As discussed above, the output color components CMY need to be adjusted to account for the addition of the output black value $K_o$. The functions $f(\ )$ and $h(\ )$ operate on the variable ϕ. The function $f(\ )$ controls the black generation in the direction from the neutral axis through the intermediate color area to saturated color. The function $h(\ )$ controls the color subtraction necessary to account for the black addition, mentioned above, in the direction from the neutral axis towards saturated color. The function $g(\ )$ operates on the highlight likelihood variable to control black subtraction in the direction highlight through mid-tone to shadow areas. Black subtraction is necessary in highlight areas to avoid graininess. These functions are user-generated and may be defined in many different ways. A graphical representation of the function $f(\ )$ is shown in FIG. 5.

The particular function used for $f(\ )$ is left up to the system designer, but there are some characteristics and considerations that may be useful. The function has a region where the variable is so small there is no black colorant used to render the more saturated color. This enlarges the color gamut and makes the more saturated colors less grainy. After ϕ becomes greater than a certain value $\phi_1$, $f(\ )$ smoothly transitions to a value of 1 through the intermediate colorful region. The smoothness of transition avoids color contouring. After the value of 1 is reached for $f(\ )$ at $\phi_2$, it remains at 1 to enforce a maximum black strategy for the color around the neutral gray axis. This avoids color fringing artifacts in black/white text edge rendering. By eliminating color dots around the black/white edges, black/white text is reproduced with sharp edge definition using maximum black dots in the mixed mode.

Figure 6:
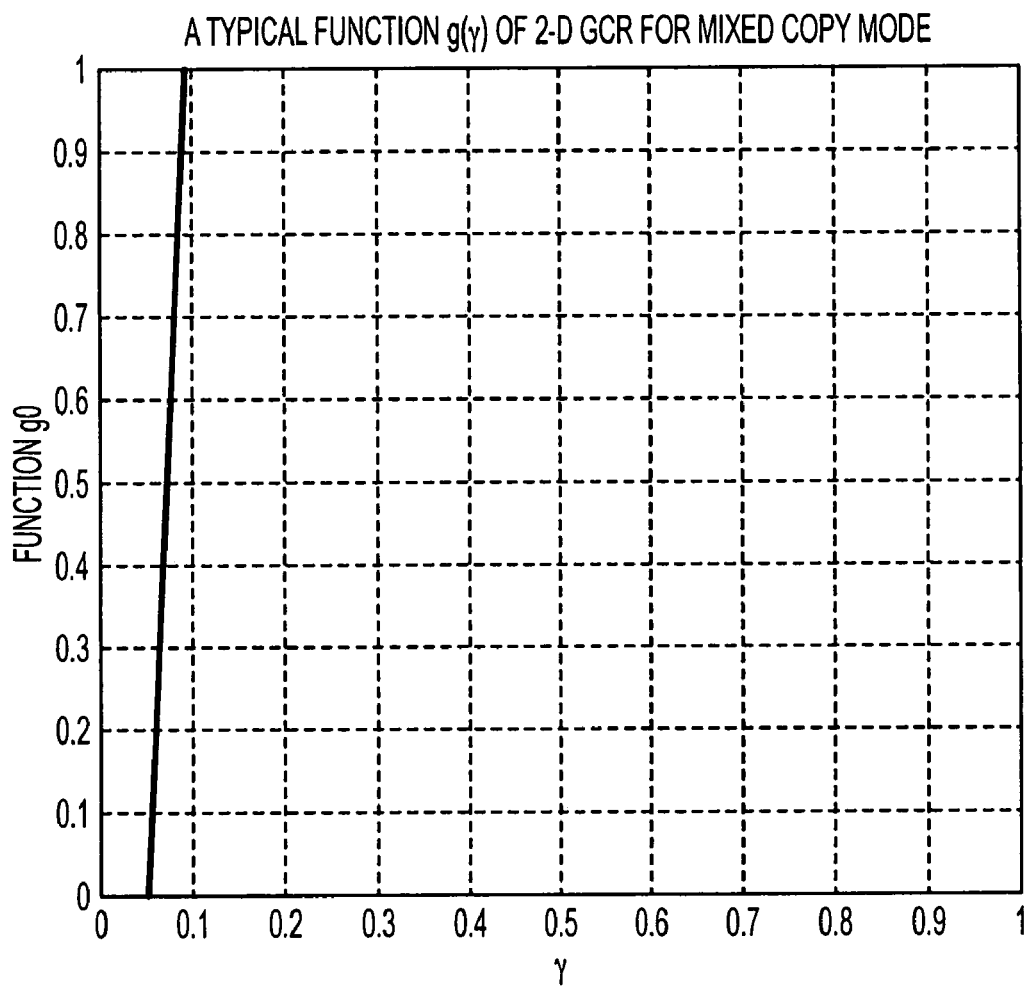
FIG. 6 shows a graphical representation of a function to control black subtraction in a direction from highlight to shadow along neutral axis.

A graphical representation of the function $g(\ )$ is shown in FIG. 6. The zero region when the quantity γ is small reduces the occurrence of black dots in these areas, reducing the graininess. Generally, the longer the function $g(\ )$ stays at zero, the better the resulting image. However, a tradeoff exists between this and the avoidance of visible color fringing artifacts in a black/white text edge area.

Scanners cannot generally capture a perfect, sharp edge of black/white texts in an original. After applying background suppression, where any color or black occurring in a region deemed to be the background is removed, there is still a pixel transition zone from light gray pixel levels at the white to dark transition and dark gray pixel levels at the dark portion of the text around the scanned text edge. If a scanner has a highly accurate modulation transfer function, the zero interval can be longer. After γ reaches a level $\gamma_1$, the function needs to transition quickly to the maximum value of 1 to avoid color fringing artifacts in the black/white text edges. The potential color-contouring artifacts are generally avoided, since the multiplication of $f(\ )$ and $g(\ )$ ultimately controls black generation.

Figure 7:
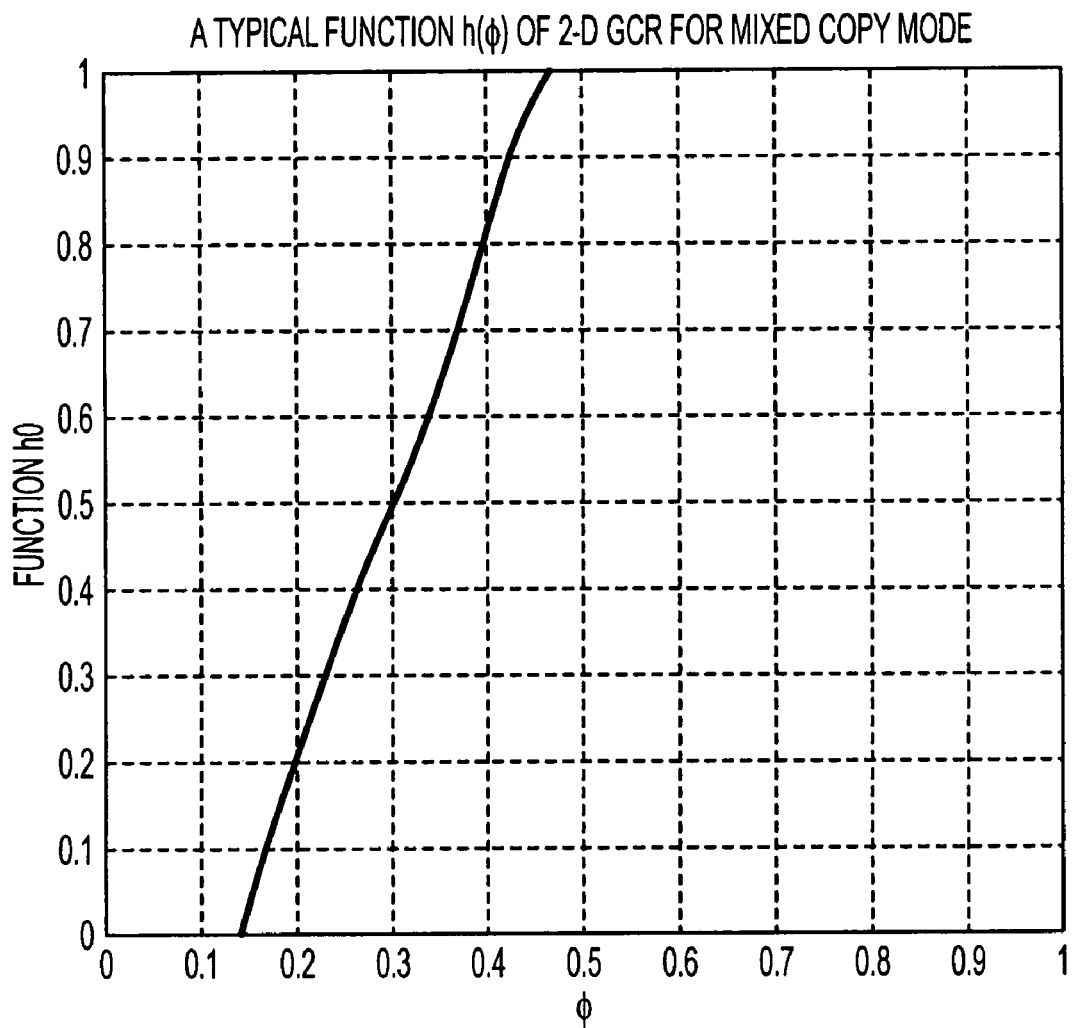
FIG. 7 shows a graphical representation of a function to control black subtraction in a direction from saturated color to neutral color axis.

A graphical representation of the function $h(\ )$ is shown in FIG. 7. The function $h(\ )$ controls the color subtraction of the GCR process. It is normally a monotonically non-decreasing function of variable $\phi$. A typical curve starts from 0 to maintain the color gamut as large as possible. It then rises smoothly to a maximum value of 1. It would not be unusual for the curve to have a zero value zone to preserve saturated dark color areas, or to have a clipped zone of value one to control the overall ink coverage. For some unusually low total area coverage (TAC) constraints, one may also want to use constant value $h(\ )$ to better meet the TAC constraint.

As mentioned above, this particular example was for the mixed mode of a combination of text, graphics and photographic images. For photographic mode, there is no concern about color fringing about the black/white edges of text. The $f(\ )$ curve can be pushed to the right, extending the zero value region and reducing the 1 region. The same would apply to $g(\ )$ and $h(\ )$ in the photographic mode. For text only mode, the maximum black strategy should be implemented to encourage black dot filling to render edges more sharply. This may be accomplished by setting all three functions to 1.

Returning to FIG. 4, these functions and variables are used to determine the output pixel color value at 38. The actual implementation of these determinations may vary depending upon the system design and requirements. For example, the determinations may be predetermined and stored in one or more look-up tables, as shown in FIG. 2. The current pixel color values of CMY could be used as an index into the look-up table for $\gamma$, the highlight likelihood, and a preliminary determination of the max and min used to index into a look-up table for $\phi$, the color neutrality. These values could then be used as an index into look-up tables for the values of $f(\ )$, $g(\ )$ and that used to calculate the value for $K_o$. The combination of these values could then be used to index into look-up tables for the color components.

In the alternative, the entire calculation could be performed in real-time, 'on the fly.' In addition, some of the calculations could be performed in real-time, with the results being used to index into various look-up tables. Alternatively, the variables could be obtained from a look-up table and used to calculate the values in real-time. There is no limit intended on the implementation of the GCR process to any particular hardware/software arrangement.

In one embodiment, for example, an article of computer-readable media such as an electronic file, diskette, compact disc or firmware loaded into a processor may contain instructions that, when executed, cause a computer to perform the methods discussed above. The computer may be a multifunction peripheral, a fax machine, a printer, a copier, etc. Similarly, the processor upon which the instructions are loaded may be a field-programmable gate array (FPGA), application specific integrated circuit (ASIC), etc.

In this manner, the gray component replacement process may be implemented in two dimensions, instead of just one. This results in higher-quality rendered images, with reduced objectionable artifacts. The process is flexible to be adjusted to different modes and systems with different modulation transfer functions and other characteristics.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

It will be appreciated that various of the above-disclosed and other features and functions, or alternatives thereof, may be desirably combined into many other different systems or applications. Also that various presently unforeseen or unanticipated alternatives, modifications, variations, or improvements therein may be subsequently made by those skilled in the art which are also intended to be encompassed by the following claims.

I claim:

1. A method of gray component replacement, comprising:
   receiving data representing an image at a color correction module, the data being organized in pixels, the pixels including a current pixel color value;
   analyzing the current pixel color value with the color correction module to determine highlight likelihood for the current pixel color value, wherein the highlight likelihood has a value that is an average of percent of coverage of input color components of the current pixel value;
   analyzing the current pixel color value with the color correction module to determine color neutrality for the current pixel color value, wherein the color neutrality has a value that is a ratio of a minimum of the input color components to a maximum of color components for the current pixel value;
   generating an output pixel color value depending upon the color neutrality value and the highlight likelihood value of the current pixel color value;
   transmitting the output pixel color value from the color correction module to an output engine for output; and
   repeating the determining highlight likelihood, determining color neutrality, generation and transmitting for each pixel in the data.

2. The method of claim 1, further comprising selecting a mode for the current color pixel value, and using that mode in generating an output pixel color value.

3. The method of claim 2, the mode being one selected from the group consisting of: mixed copy mode, text mode, and photographic mode.

4. The method of claim 1, determining highlight likelihood further comprising using the current pixel color value as an index into a look-up table containing the highlight likelihood.

5. The method of claim 1, determining the color neutrality for the current pixel color value further comprising using the current pixel color value as an index into a look-up table containing the color neutrality.

6. The method of claim 1, determining the color neutrality, the highlight likelihood and generating the highlight likelihood further comprising using the current color pixel value as an index into a look-up table.

7. The method of claim 1, determining the color neutrality, the highlight likelihood and generating the highlight likelihood further comprising real-time calculations.

8. An imaging system, comprising:
   an image acquisition engine to acquire image data representative of an input image organized as pixels;
   an image processing module to process the image data, including a color conversion module to:
      analyze the current pixel color value with the color correction module to determine highlight likelihood for the current pixel color value, wherein the highlight likelihood has a value that is an average of percent of coverage of input color components of the current pixel value;

analyze the current pixel color value with the color correction module to determine color neutrality for the current pixel color value, wherein the color neutrality has a value that is a ratio of a minimum of the input color components to a maximum of color components for the current pixel value;

generate an output color pixel value using the highlight likelihood value and the color neutrality value; and repeat the image processing for each pixel in the image data; and an output engine to render the output color pixel value as an output color pixel.

9. The imaging system of claim 8, the system further comprising a memory.

10. The imaging system of claim 9, the memory further comprising a look-up table used by the processing module to generate the output color pixel value.

11. The imaging system of claim 9, the imaging system further comprising a multi-function peripheral.

12. The imaging system of claim 8, the output engine further comprising a xerographic print engine.

13. The imaging system of claim 8, the image acquisition engine further comprising one selected from the group consisting of: a scanner, a connection to a host computer, a data network connection, and a fax receiver.

14. An article of machine-readable media having a machine-readable code embodied therein, said machine-readable code containing instructions that, when executed by a hardware device, cause the hardware device to:

receive data representing an image organized as pixels from an image acquisition engine at the hardware device, the data including a current pixel color value;

analyze the current pixel color value with the color correction module to determine highlight likelihood for the current pixel color value, wherein the highlight likelihood has a value that is an average of percent of coverage of input color components of the current pixel value;

analyze the current pixel color value with the color correction module to determine color neutrality for the current pixel color value, wherein the color neutrality has a value that is a ratio of a minimum of the input color components to a maximum of color components for the current pixel value;

generate an output pixel color value depending upon the color neutrality and the highlight likelihood values;

transmitting the output pixel color value to an output engine from the hardware device for output; and repeating the determining highlight likelihood, determining color neutrality, generation and transmitting for each pixel of the data.

15. The article of claim 14, further containing instructions that, when executed, cause the hardware device to set an input mode.

16. The article of claim 15, the instructions causing the hardware device to generate an output pixel color value further causing the hardware device to generate an output pixel color value depending upon the input mode.

17. The article of claim 14, the instructions causing the hardware device to generate an output pixel color further comprising instructions causing the hardware device to access a look-up table to obtain the output pixel color value.

18. The article of claim 14, the instructions causing the hardware device to determine highlight likelihood, color neutrality, and generate an output pixel color value further cause the hardware device to determine highlight likelihood, color neutrality and generate an output pixel color value in real time.

* * * * *